United States Patent
Ogata et al.

(10) Patent No.: US 10,488,656 B2
(45) Date of Patent: Nov. 26, 2019

(54) DISPLAY DEVICE, AND MOBILE BODY HAVING SAME

(71) Applicant: Panasonic Intellectual Property Management Co., Ltd., Osaka (JP)

(72) Inventors: Masahito Ogata, Osaka (JP); Toshiya Mori, Osaka (JP); Kosuke Kubota, Osaka (JP); Ken'Ichi Kasazumi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 64 days.

(21) Appl. No.: 15/891,388

(22) Filed: Feb. 8, 2018

(65) Prior Publication Data

US 2018/0284434 A1 Oct. 4, 2018

(30) Foreign Application Priority Data

Mar. 31, 2017 (JP) .................................. 2017-072707

(51) Int. Cl.
- *G06F 1/00* (2006.01)
- *G02B 27/01* (2006.01)
- *G03B 21/20* (2006.01)
- *G06K 9/00* (2006.01)

(52) U.S. Cl.
CPC ..... *G02B 27/0101* (2013.01); *G03B 21/2033* (2013.01); *G06K 9/00671* (2013.01); *B60R 2300/205* (2013.01); *G02B 2027/0181* (2013.01)

(58) Field of Classification Search
CPC .. G02B 27/0149; G02B 27/01; G02B 27/017; G02B 27/0176; G02F 1/133; G06F 1/00; G06F 3/011; G06F 3/017
See application file for complete search history.

(56) References Cited

U.S. PATENT DOCUMENTS

| 2016/0161742 A1* | 6/2016 | Yonemoto | B60K 35/00 349/11 |
| 2017/0235138 A1* | 8/2017 | Morohashi | B60K 35/00 359/631 |

FOREIGN PATENT DOCUMENTS

JP 5930231 B 6/2016

* cited by examiner

*Primary Examiner* — Michael A Faragalla
(74) *Attorney, Agent, or Firm* — Greenblum & Bernstein, P.L.C.

(57) ABSTRACT

A display device includes a video display, an optical element, and a projector. The video display displays a video on the video display surface. The optical element receives, on an incident surface, at least a part of the video displayed on the video display surface, and emits an incident video, which is the part of the video received on the incident surface, from an emitting surface. The projector projects a virtual image viewed by a user by projecting light output from the video display and the optical element to a reflecting member. An inclined portion inclined with respect to at least a part of the video display surface is provided on at least a part of the emitting surface of the optical element.

17 Claims, 8 Drawing Sheets

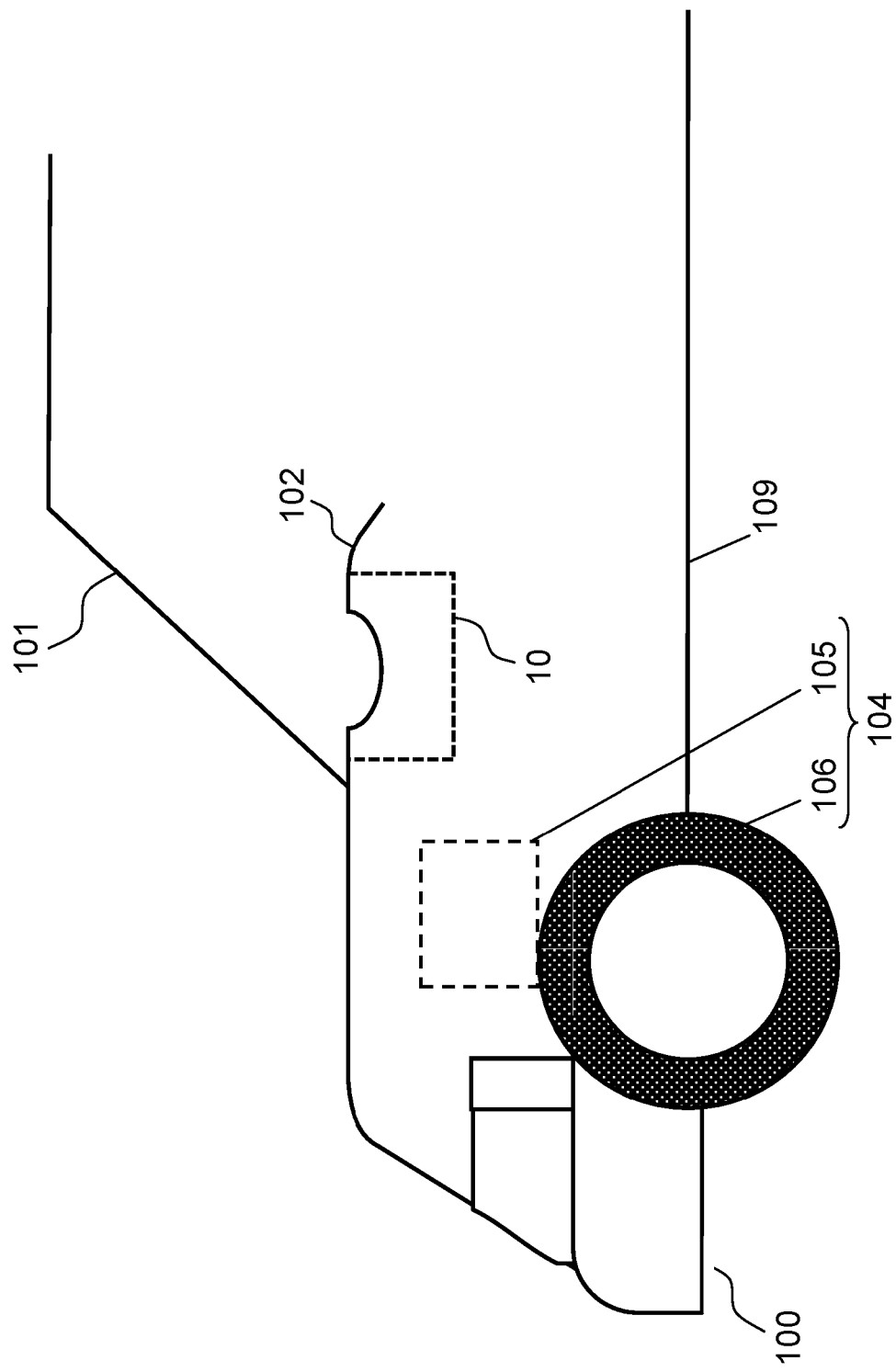

ed through the video display and the optical element.
DISPLAY DEVICE, AND MOBILE BODY HAVING SAME The present application claims the benefit of foreign priority of Japanese patent application 2017-072707 filed on Mar. 31, 2017, the contents all of which are incorporated herein by reference.

BACKGROUND

1. Technical Field

The present disclosure relates to a display device, and to a mobile body having the same. In particular, the present disclosure relates to a display device that projects a virtual image onto a target space, and to a mobile body having the same.

2. Description of the Related Art

Conventionally, a head-up display device mounted on a vehicle has been known (for example, see Japanese patent No. 5930231).

The head-up display device described in Japanese patent No. 5930231 includes: a projection device; a first screen; a second screen; and a relay optical system composed of a flat mirror and a concave mirror. In the head-up display device, the relay optical system reflects a first display image, which is projected onto the first screen by the projection device, and a second display image, which is projected onto the second screen by the projection device, toward a windshield of the vehicle. This causes a user to view a first virtual image that is based on the first display image and a second virtual image that is based on the second display image.

In this head-up display device, the second screen is disposed perpendicularly to an optical axis of projection light projected onto the second screen, and the first screen is disposed to obliquely intersect an optical axis of projection light projected onto the first screen. In this way, the first virtual image based on the first display image is displayed along a road surface, and the second virtual image is displayed perpendicularly to the road surface.

SUMMARY

The present disclosure provides a display device capable of improving resolution of a virtual image, and provides a mobile body having the display device.

A display device of a first aspect includes a video display, an optical element, and a projector. The video display displays a video on the video display surface. The optical element receives, on an incident surface, at least a part of the video displayed on the video display surface, and emits an incident video, which is the part of the video received on the incident surface, from an emitting surface. The projector projects a virtual image viewed by a user by projecting light output from the video display and the optical element to a reflecting member. An inclined portion inclined with respect to at least a part of the video display surface is provided on at least a part of the emitting surface of the optical element.

In a display device of a second aspect, in the first aspect, the virtual image includes a first virtual image projected onto a first virtual plane in which an inclination angle with respect to an optical axis of the projector is smaller than a predetermined value, and a second virtual image projected onto a second virtual plane in which an inclination angle with respect to the optical axis of the projector is larger than the predetermined value.

In a display device of a third aspect, in the second aspect, the optical element is disposed on a part of the video display surface. The second virtual image is projected by light transmitted through the inclined portion, and the first virtual image is projected by light transmitted through a portion other than the inclined portion out of light transmitted through the video display and the optical element.

In a display device of a fourth aspect, in the second aspect, the inclined portion is provided on a part of the emitting surface of the optical element. The first virtual image is projected by light transmitted through the inclined portion, and the second virtual image is projected by light transmitted through a region other than the inclined portion out of the emitting surface.

In a display device of a fifth aspect, in any one of the first to fourth aspects, the incident surface of the optical element is inclined with respect to a projection direction in which the light output from the video display is projected, and the emitting surface of the optical element is perpendicular to the projection direction in which the light output from the video display is projected.

In a display device of a sixth aspect, in any one of the first to fourth aspects, the incident surface of the optical element is perpendicular to a projection direction in which the light output from the video display is projected. The emitting surface of the optical element is inclined with respect to the projection direction in which the light output from the video display is projected.

In a display device of a seventh aspect, in any one of the first to sixth aspects, the optical element is disposed in front of the video display surface in a projection direction in which the light is projected.

In a display device of an eighth aspect, in any one of the first to seventh aspects, a light diffuser that diffuses light is provided on the emitting surface of the optical element.

In a display device of a ninth aspect, in any one of the first to eighth aspects, the video display is a projection device that projects light onto the video display surface to form an image on the video display surface.

In a display device of a tenth aspect, in any one of the first to eighth aspects, the video display is a video display device that has a flat display panel displaying the video, and a backlight.

A mobile body of an eleventh aspect includes: a body; the display device according to any one of the first to tenth aspects, the display device being mounted on the body; the reflecting member fixed to the body; and a drive unit that moves the body.

In accordance with the present disclosure, the resolution of the virtual image can be improved.

BRIEF DESCRIPTION OF DRAWINGS

FIG. 10 is a conceptual diagram of the vehicle having the display device according to the exemplary embodiment.

DETAILED DESCRIPTION

Prior to describing an exemplary embodiment of the present disclosure, problems found in conventional techniques will be briefly described herein. The head-up display device described in Japanese patent No. 5930231 includes the first screen and the second screen, which have different inclinations from each other with respect to the projection light, in order to display the first virtual image displayed along the road surface and the second virtual image displayed perpendicularly to the road surface. Then, the projection light from the single projection device is allowed to form images on two screens (first screen and second screen) placed at different distances. Therefore, it has been necessary increase (deepen) a depth of focus of the optical system in the projection device. As a result, there has been a problem that the resolution of the virtual images decreases.

An exemplary embodiment to be described below is merely one of various exemplary embodiments of the present disclosure. The exemplary embodiments of the present disclosure are not limited to the following exemplary embodiment, and can include embodiments other than this exemplary embodiment. Moreover, the following exemplary embodiment is variously modifiable in response to design and the like without departing from the technical idea according to the present disclosure.

(1) Outline

Figure 1:
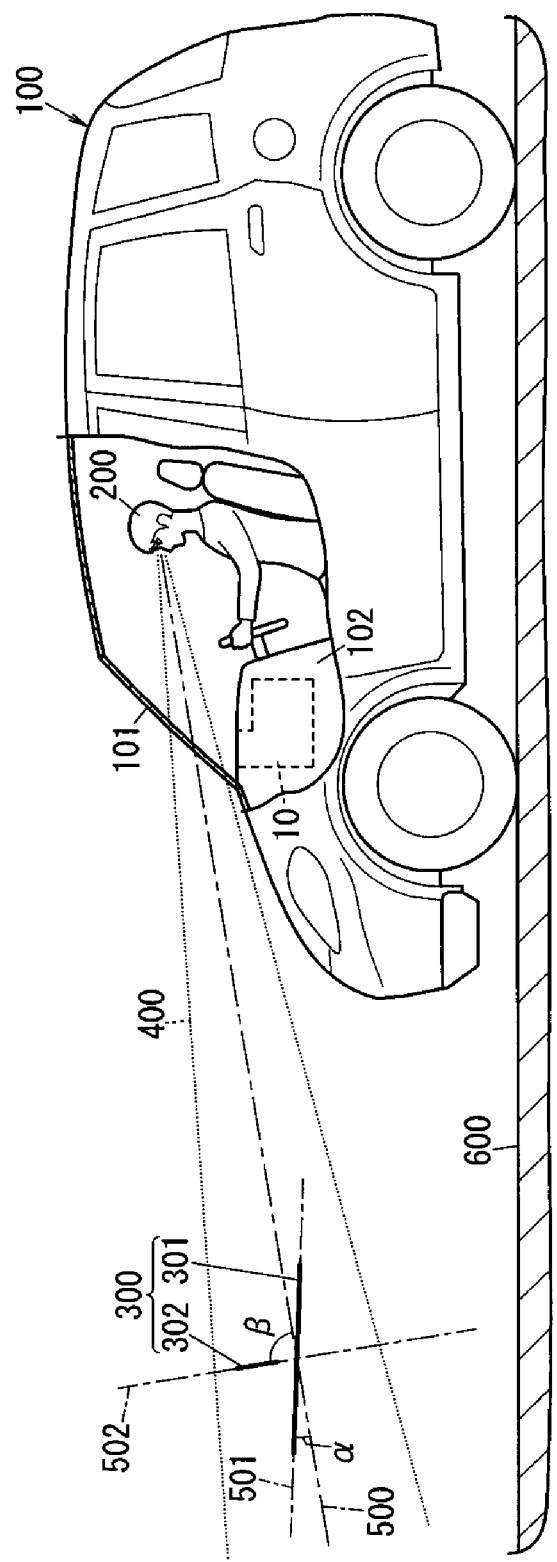
FIG. 1 is a conceptual diagram of a vehicle having a display device according to an exemplary embodiment of the present disclosure.

As shown in FIG. 1, display device 10 according to this exemplary embodiment is a head-up display (HUD) for use in vehicle 100 as a mobile body, for example. As shown in FIG. 10, vehicle 100 includes: body 109; vehicle drive unit 104 that moves body 109; windshield 101 fixed to body 109; and display device 10 disposed in dashboard 102 of body 109. Vehicle drive unit 104 includes drive source 105 such as an engine and a motor, and drive wheels 106 driven by drive source 105.

As shown in FIG. 1, display device 10 is installed in a cabin of vehicle 100 so as to project an image onto windshield 101 of vehicle 100 from below. In an example of FIG. 1, display device 10 is disposed in dashboard 102 installed below windshield 101. When the image is projected from display device 10 onto windshield 101, the image reflected on windshield 101 as a reflection member is viewed by user 200 (driver).

In accordance with display device 10, virtual image 300 looks like being projected onto target space 400 in front of vehicle 100 (outside of the vehicle) for user 200 seated on a driver's seat. The "virtual image" mentioned herein means an image formed by a reflected ray of emitted light from display device 10 as if an object were actually present when the emitted light is reflected by a reflecting object such as windshield 101. Therefore, user 200 who drives vehicle 100 can see virtual image 300, which is projected by display device 10, while superimposing virtual image 300 on a real space spreading in front of vehicle 100. Hence, in accordance with display device 10, various pieces of driving assistance information such as vehicle speed information, navigation information, pedestrian information, front vehicle information, lane departure information and vehicle condition information can be displayed as virtual image 300, and can cause user 200 to view the various pieces of driving assistance information. In this way, user 200 can visually acquire the driving assistance information by only a slight movement of a line of sight from a state of directing the line of sight forward of windshield 101.

In display device 10 according to this exemplary embodiment, virtual image 300 formed in target space 400 includes at least two types of virtual images, which are first virtual image 301 and second virtual image 302. The "first virtual image" mentioned herein is virtual image 300 (301) formed on first virtual plane 501. The "first virtual plane" is a virtual plane in which inclination angle $\alpha$ with respect to optical axis 500 of display device 10 is smaller than predetermined value $\gamma$ ($\alpha<\gamma$). Moreover, the "second virtual image" mentioned herein is virtual image 300 (302) formed on second virtual plane 502. The "second virtual plane" is a virtual plane in which inclination angle $\beta$ with respect to optical axis 500 of display device 10 is larger than predetermined value $\gamma$ ($\beta>\gamma$). The "optical axis" mentioned herein is an optical axis along a direction in which the virtual image is projected onto target space 400 by projection optical system 40 (see FIG. 3) to be described later. That is, the "optical axis" means an axis that passes through target space 400 and goes along an optical path of virtual image 300. An example of predetermined value $\gamma$ is 45 degrees, and an example of inclination angle $\beta$ is 90 degrees.

In this exemplary embodiment, optical axis 500 is along road surface 600 in front of vehicle 100 in target space 400 in front of vehicle 100. Then, first virtual image 301 is formed on first virtual plane 501 substantially parallel to road surface 600, and second virtual image 302 is formed on second virtual plane 502 substantially perpendicular to road surface 600. For example, when road surface 600 is a horizontal plane, first virtual image 301 is formed along the horizontal plane, and second virtual image 302 is displayed along a vertical plane.

Figure 2:
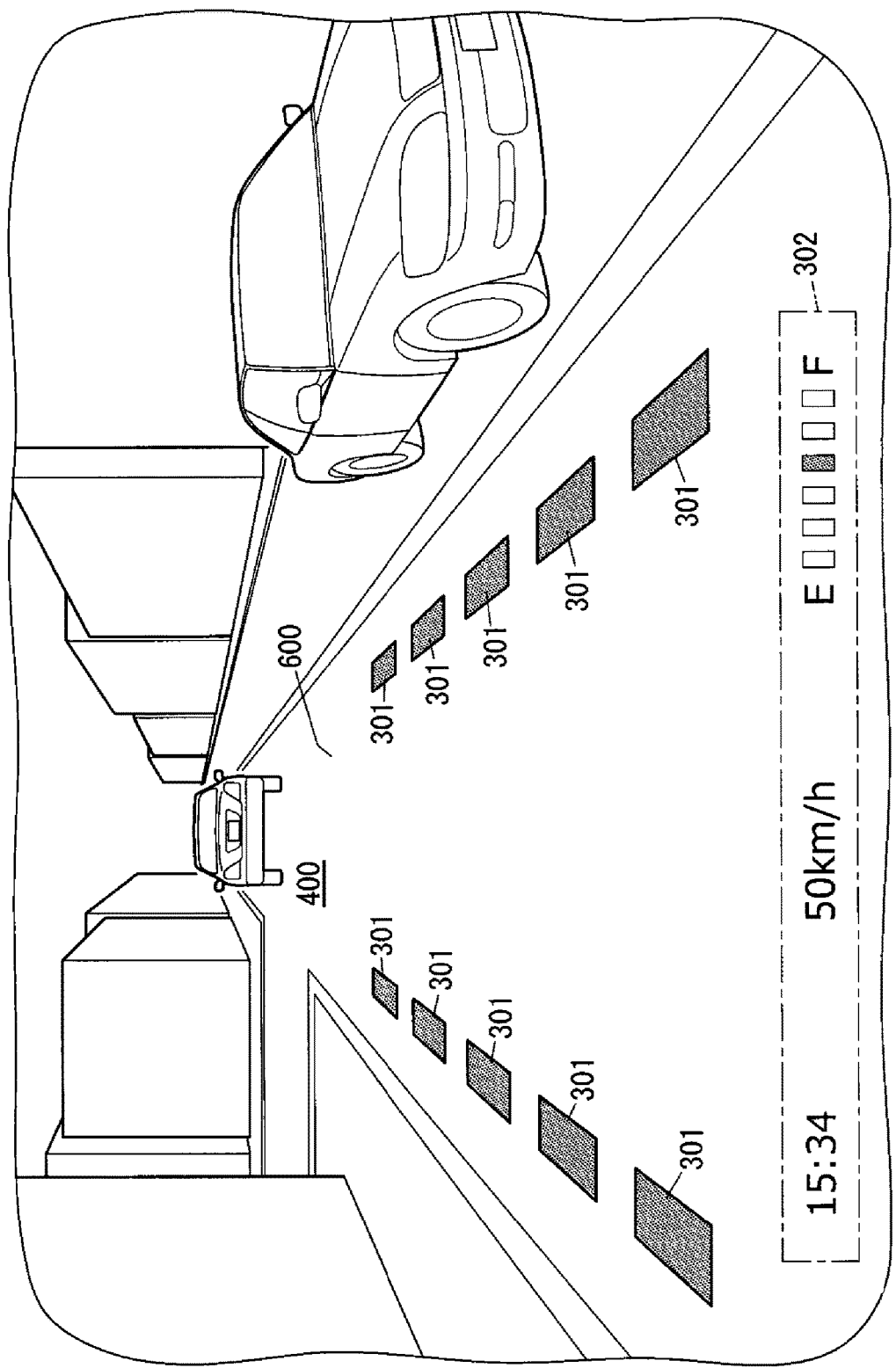
FIG. 2 is a conceptual diagram showing a user's visual field when the display device is used.

FIG. 2 is a conceptual diagram showing a visual field of user 200. That is, as shown in FIG. 2, display device 10 according to this exemplary embodiment is capable of displaying first virtual image 301 viewed with depth along road surface 600 and second virtual image 302 viewed upright on road surface 600 at a fixed distance from user 200. Hence, for user 200, first virtual image 301 looks like being present on a plane substantially parallel to road surface 600, and second virtual image 302 looks like being present on a plane substantially perpendicular to road surface 600. An example of first virtual image 301 is navigation information indicating a traveling direction of vehicle 100, where it is possible to present an arrow, which indicates a right turn or a left turn, on road surface 600. An example of second virtual image 302 is a current time, vehicle speed information, and vehicle condition information. It is possible to present these pieces of the information, for example, by letters, numbers, and symbols, or a meter such as a fuel gauge. Here, preferably, for user 200, first virtual image 301 looks like being displayed, for example, 10 m to 200 m ahead of vehicle 100 so as to serve as a guide for driving vehicle 100. Second virtual image 302 is displayed on a lower portion of windshield 101 so as not to hinder user 200 (driver) from viewing a road condition. Preferably, for user 200, second virtual image 302 looks like being displayed a few meters (for example, 2 m to 3 m) ahead of vehicle 100.

(2) Configuration

Figure 3:
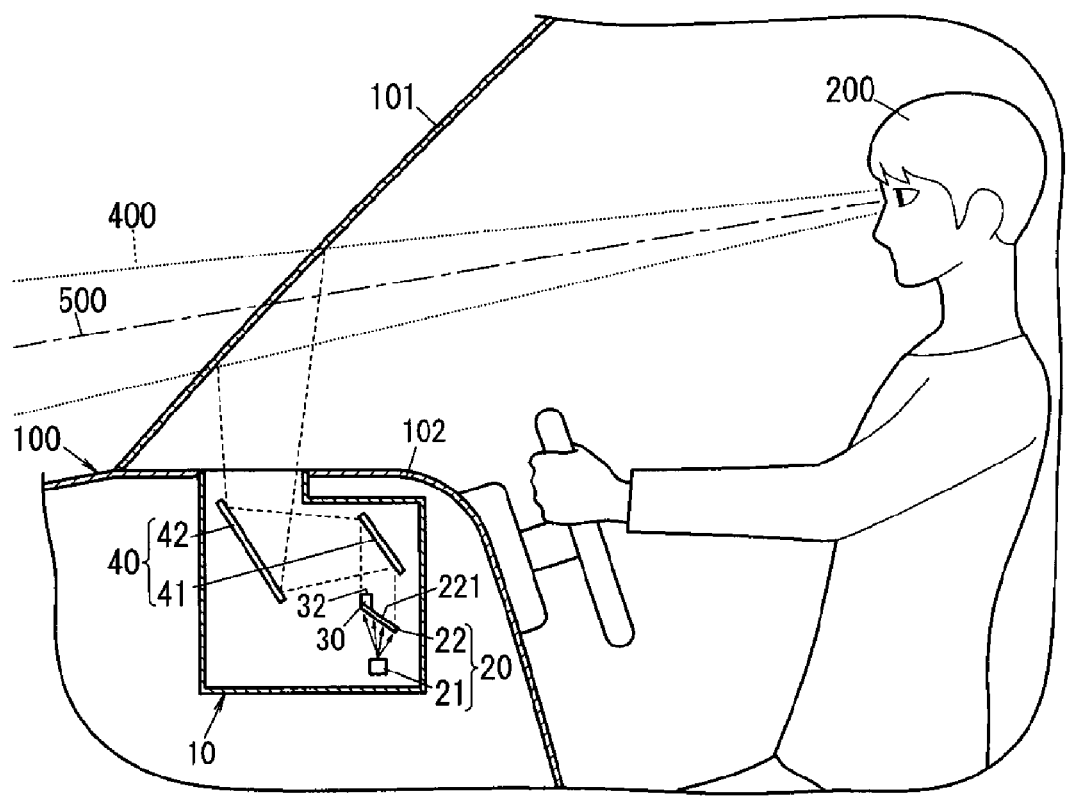
FIG. 3 is a conceptual diagram showing a configuration of the display device.
Figure 4:
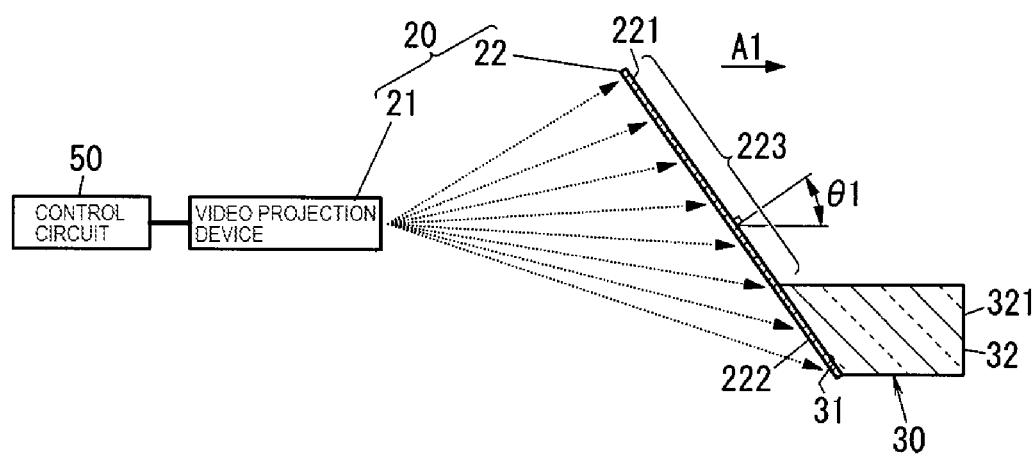
FIG. 4 is a conceptual diagram showing principal portions of the display device.

As shown in FIGS. 3 and 4, display device 10 according to this exemplary embodiment includes: video display 20; optical element 30; projection optical system 40 as a projector; and control circuit 50.

Video display 20 includes video projection device 21 and screen 22.

Onto an incident surface of screen 22, video projection device 21 projects an image for forming virtual image 300 in target space 400.

Figure 5A:
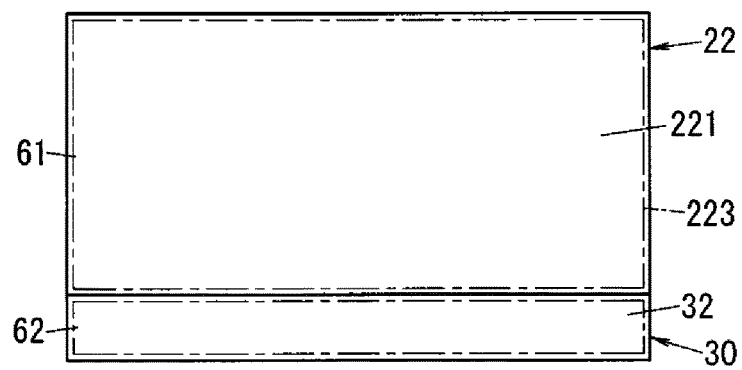
FIG. 5A is a front view showing a screen of the display device.

For example, screen 22 is composed, for example, of a plate-shaped transparent screen that has light diffusibility and is formed into a rectangular shape (see FIG. 5A). Screen 22 is fixed at a predetermined position with respect to a housing and the like of display device 10. On screen 22, an image is drawn by light projected from video projection device 21, and the image is projected onto windshield 101 by the light that passes through screen 22. Herein, a surface of screen 22 serves as video display surface 221 that displays a video.

For example, optical element 30 is a bundle formed by bundling a plurality of optical fibers with a cladding diameter ranging from several micrometers to several ten micrometers. Optical element 30 is formed into a rectangular shape as viewed from front (see FIG. 5A). Light that enters incident surface 31 on one end side of optical element 30 is guided as it is to emitting surface 32 on other end side of optical element 30. That is, optical element 30 transmits an incident video that enters optical element 30 from incident surface 31, to emitting surface 32, and emits the incident video from emitting surface 32.

Optical element 30 is disposed on video display surface 221 such that incident surface 31 overlaps a part of video display surface 221 of screen 22 Optical element 30 is fixed to video display surface 221, for example, by a transparent adhesive or the like.

For example, optical element 30 has a prismatic shape, and incident surface 31 of optical element 30 is formed as an inclined surface along the surface of screen 22. Therefore, optical element 30 protrudes from the surface of screen 22 toward a direction that obliquely intersects a normal line direction of the surface of screen 22. That is, in optical element 30 shown in FIG. 4, a whole of emitting surface 32 of optical element 30 is formed as inclined portion 321 inclined with respect to video display surface 221.

Then, video display surface 221 is disposed such that a normal line of video display surface 221 and a projection direction (A1 in FIG. 4) of the video intersect each other at predetermined angle θ1 (0<θ1<90). Emitting surface 32 of optical element 30 is perpendicular to projection direction A1 of the video. That is, a surface of inclined portion 321 is inclined with respect to a whole of video display surface 221. The term "perpendicular" mentioned herein is not limited to such a case in which two objects intersect each other at a right angle, and allows a little deviation (about a few degrees) from a perpendicular direction if the deviated direction can be regarded as a substantially perpendicular direction as viewed with human eyes. The surface of inclined portion 321 is inclined with respect to the whole of video display surface 221; however, may be inclined with respect to a part of video display surface 221.

In this way, out of the video displayed on video display surface 221, a video caused to enter region 223 that is other than the region overlapping incident surface 31 is displayed on the surface inclined with respect to projection direction A1. Therefore, by this video, first virtual image 301 is projected onto target space 400. Moreover, out of the video displayed on video display surface 221, an incident video made incident onto incident surface 31 of optical element 30 is displayed on the surfaces (emitting surface 32, inclined portion 321) perpendicular to projection direction A1. Therefore, by this video, second virtual image 302 is projected onto target space 400.

Further, the video made incident onto incident surface 31 of optical element 30 is moved to a position distant from screen 22 (video display 20) by an overall length of optical element 30 in the projection direction (A1 in FIG. 4) of the video.

In this way, a route length of the light to user 200 from emitting surface 32 of optical element 30 is shorter than a route length of the light to user 200 from region 223 that does not overlap optical element 30 in video display surface 221. Hence, the virtual image formed by the video displayed on emitting surface 32 is displayed at a position closer to vehicle 100 than the virtual image formed by the video displayed on region 223 of video display surface 221 is. Accordingly, in display device 10 of this exemplary embodiment, the video for forming first virtual image 301 is displayed on region 223 of video display surface 221, and the video for forming second virtual image 302 is displayed on emitting surface 32. For example, in order to display first virtual image 301 at a position located 10 m to 200 m ahead of vehicle 100, and to display second virtual image 302 at a position located a few meters (for example, 2 m to 3 m) ahead of vehicle 100, the overall length of optical element 30 is set preferably to mm to 20 mm, more preferably to 5 mm to 10 mm.

Projection optical system 40 projects virtual image 300 onto target space 400 by the light output from video display surface 221 and emitting surface 32 of optical element 30 (see FIG. 1). As shown in FIG. 3, projection optical system 40 includes first mirror 41 and second mirror 42.

First mirror 41 and second mirror 42 are arranged in this order on the routes of the light emitted from video display surface 221 and emitting surface 32 of optical element 30. First mirror 41 reflects the light, which is emitted from video display surface 221 and emitting surface 32 of optical element 30, toward second mirror 42. Second mirror 42 reflects the light, which is emitted from first mirror 41, toward windshield 101 (see FIGS. 1 and 3). That is, projection optical system 40 projects the videos, which are formed on video display surface 221 and emitting surface 32 of optical element 30, onto windshield 101, thereby projecting virtual image 300 onto target space 400. Note that projection optical system 40 is not limited to one including first mirror 41 and second mirror 42, and may include a lens and another mirror for magnifying or reducing the video in addition to first mirror 41 and second mirror 42. Moreover, projection optical system 40 including the lens, the mirrors and the like may be omitted, and in that case, video projection device 21 also serves as the projector that projects the virtual image onto the target space. That is, the light emitted from video projection device 21 and then emitted from screen 22 and optical element 30 may be projected toward windshield 101 without passing through first mirror 41 and second mirror 42.

Control circuit 50 controls an operation of video projection device 21. For example, control circuit 50 receives a signal from a driving support system mounted on vehicle 100, and determines a content of virtual image 300 to be projected. Control circuit 50 creates a video corresponding to the content of virtual image 300, and controls video projection device 21 to display the created video.

Herein, control circuit 50 is composed of a microcomputer including a central processing unit (CPU) and a memory. In other words, control circuit 50 is realized by such a computer including the CPU and the memory. The CPU executes a program stored in the memory, whereby the computer functions as control circuit 50. Herein, the program is recorded in advance in the memory of control circuit 50; however, may be provided via a telecommunication line such as the Internet or by being recorded in a recording medium such as a memory card.

(3) Operation

Operation of display device 10 according to this exemplary embodiment will now be described herein with reference to FIGS. 1 to 4.

Control circuit 50 controls video projection device 21 to irradiate screen 22 with light from video projection device 21. When screen 22 is irradiated with the light from video projection device 21, the video is formed (projected) on such front surface 221 and back surface 222 of screen 22. Herein, out of both surfaces in a thickness direction of screen 22, a surface facing video projection device 21 is referred to as back surface 21, and a surface opposite with back surface 222 is referred to as front surface 221. In this exemplary embodiment, as an example, since the surface of screen 22 has light diffusibility, the video is formed on the surface (video display surface 221) of screen 22. Then, out of the videos formed on video display surface 221, the video formed on the region that overlaps optical element 30 enters incident surface 31 of optical element 30. The incident video made incident from incident surface 31 of the optical element 30 is transmitted to emitting surface 32 of optical element 30 by optical element 30. Hence, the videos are individually displayed on region 223 in which optical element 30 does not overlap on video display surface 221 and on emitting surface 32 of optical element 30. Then, the videos individually displayed on region 223 of video display surface 221 and on emitting surface 32 of optical element 30 are reflected by first mirror 41 and second mirror 42, and are projected onto windshield 101. In this way, the videos individually displayed on region 223 of video display surface 221 and on emitting surface 32 of optical element 30 are projected onto windshield 101 from below windshield 101 in the cabin of vehicle 100.

When the video is projected from projection optical system 40 onto windshield 101, windshield 101 reflects the light, which is projected from projection optical system 40, toward user 200 (driver) in the cabin. This allows user 200 to view the video reflected by windshield 101. As a result, user 200 views virtual image 300 (first virtual image 301 or second virtual image 302), which is projected in front of vehicle 100 (outside of the vehicle), through windshield 101. That is, user 200 can see virtual image 300 (first virtual image 301 or second virtual image 302) while superimposing virtual image 300 concerned on a scene outside the vehicle, which is seen through windshield 101.

In display device 10 of this exemplary embodiment, inclined portion 321 inclined with respect to video display surface 221 is provided on emitting surface 32 of optical element 30. Hence, the inclination of the video displayed on inclined portion 321 of optical element 30 can be differentiated from that of the video displayed on region 223 that does not overlap optical element 30 in video display surface 221. An angle of the virtual image (first virtual image 301), which is projected by the video on region 223 of video display surface 221, with respect to road surface 600, and an angle of the virtual image (second virtual image 302), which is projected by the video on inclined portion 321 of optical element 30, with respect to road surface 600 can be differentiated from each other. Herein, optical element 30 is provided on video display surface 221, and there is no gap between incident surface 31 of optical element 30 and region 223 which optical element 30 does not overlap on video display surface 221. Therefore, leak light with which video display 20 directly irradiates user 200 can be reduced.

Moreover, though screen 22 alone can do nothing but project only first virtual image 301 along road surface 600, second virtual image 302 can also be projected by disposing optical element 30 having inclined portion 321 on screen 22.

Further, in display device 10 of this exemplary embodiment, a part of the video displayed on video display surface 221 (that is, the incident video made incident onto incident surface 31) is moved by optical element 30 in a direction away from video projection device 21 by an amount of the overall length of optical element 30 with respect to video display surface 221. Hence, in display device 10 of this exemplary embodiment, the route length of the light between emitting surface 32 of optical element 30 and user 200 can be shortened by the amount of the overall length of optical element 30 more than the route length of the light between region 223 of video display surface 221 and user 200. Hence, second virtual image 302 projected by the video displayed on emitting surface 32 of optical element 30 is displayed closer to user 200 than first virtual image 301 projected by the video displayed on region 223 of video display surface 221 is.

Moreover, in display device 10 of this exemplary embodiment, optical element 30 is disposed in front of video display surface 221 in projection direction A1 of the light, and video display surface 221 for displaying first virtual image 301 and second virtual image 302 can be composed of screen 22 that is single.

Furthermore, in display device 10 of this exemplary embodiment, as shown in FIG. 4, optical element 30 is disposed on only a part of video display surface 221. Incident surface 31 of optical element 30 is inclined with respect to an emission direction (projection direction A1) of the light from video projection device 21, and emitting surface 32 of optical element 30 is perpendicular to the emission direction (projection direction A1) of the light from video projection device 21. Hence, emitting surface 32 of optical element 30 serves as inclined portion 321 inclined with respect to video display surface 221. Hence, second virtual image 302 can be projected onto target space 400 by the light transmitted through inclined portion 321, and first virtual image 301 is projected by the light transmitting through region 223 on video display surface 221.

(4) Modified Examples

Figure 5B:
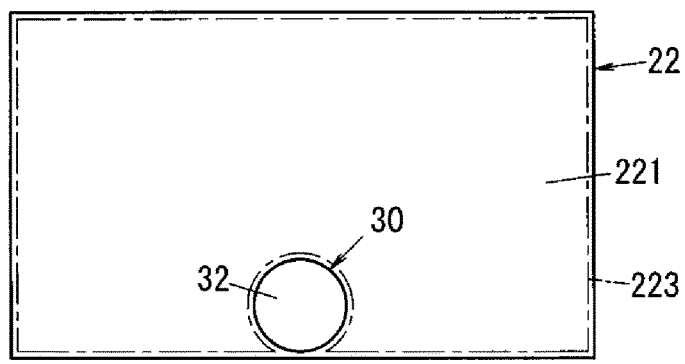
FIG. 5B is a front view showing a screen of a display device according to a first modified example of the exemplary embodiment of the present disclosure.

In the above-described exemplary embodiment, the shape of optical element 30 as viewed from the front is not limited to rectangular, and as shown in FIG. 5B, the shape of optical element 30 as viewed from the front may be circular, and this circular optical element 30 is suitable for displaying a circular meter and the like (first modified example). Moreover, as long as optical element 30 is capable of displaying the video for projecting virtual image 300, the shape of optical element 30 may be a polygonal shape, an ellipsoidal shape and the like, which are other than such a rectangular shape. In a similar way, as long as screen 22 is capable of displaying the video for projecting virtual image 300, the shape of screen 22 may be a polygonal shape, an ellipsoidal shape, a circular shape, and the like, which are other than such a rectangular shape.

In the above-described exemplary embodiment, optical element 30 is not limited to the bundle formed by bundling the optical fibers, and may be a group of fibrous crystals (so-called television stones) in which elongated crystals of minerals are parallel-intergrown.

Figure 6:
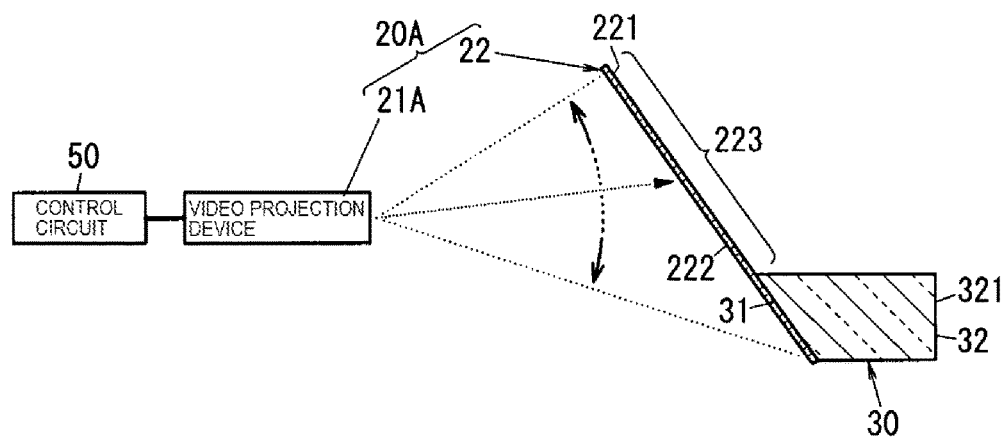
FIG. 6 is a conceptual diagram showing principal portions of a display device according to a second modified example of the exemplary embodiment of the present disclosure.

In the above-described exemplary embodiment, video display 20 is the video projection device that simultaneously projects the whole of the video and forms an image on video display surface 221. However, the video projection device may be video display 20A including video projection device 21A of a laser scanning type as shown in FIG. 6 (second modified example). Note that the same reference numerals are assigned to constituents common to those in the above-described exemplary embodiment, and a description of the constituents will be omitted.

Video projection device 21A includes: a laser light source that outputs laser light; and a scanning optical system such as a microelectromechanical system (MEMS) mirror that scans the laser light output from the laser light source. Video projection device 21A scans the laser light, which is output from the laser light source, by the scanning optical system, whereby videos are drawn on region 223 of video display surface 221 of screen 22 and on emitting surface 32 of optical element 30.

In each of the above-described exemplary embodiment and the first and second modified examples, the "video display surface" just needs to be a surface for forming an image on screen 22, is not limited to surface 221 of screen 22, and for example, may be back surface 222 of screen 22. Moreover, an entire region of front surface 221 (or back surface 222) of screen 22 does not need to be the "video display surface", and the "video display surface" may be a partial region of front surface 221 (or back surface 222) of screen 22. In this case, the image is formed only on a partial region of front surface 221 (or back surface 222) of screen 22.

Moreover, screen 22 is not limited to such a configuration in which the light diffusibility is provided to only front surface 221, and for example, the light diffusibility may be provided to only back surface 222 or to both of front surface 221 and back surface 222. When the light diffusibility is provided to back surface 222 of screen 22, the image is formed on back surface 222 of screen 22.

Figure 7:
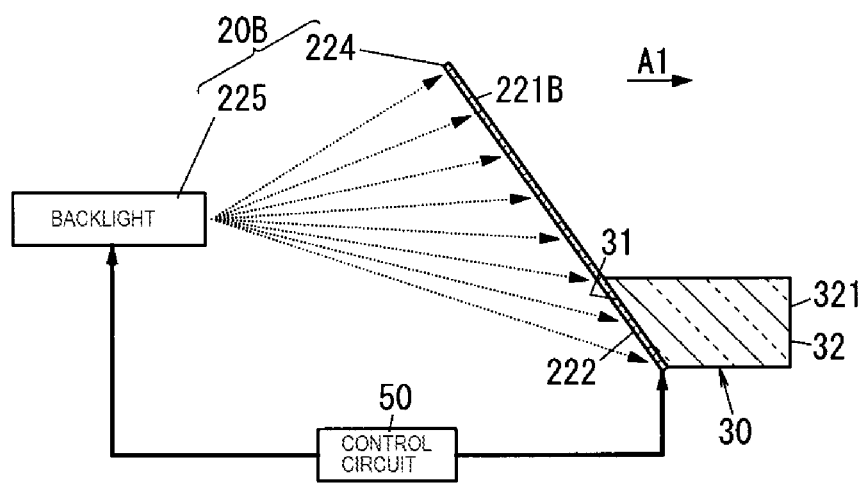
FIG. 7 is a conceptual diagram showing principal portions of a display device according to a third modified example of the exemplary embodiment of the present disclosure.

Moreover, video display 20 is not limited to those having video projection device 21, 21A which project the light onto screen 22. Video display 20 may be image display 20B as shown in FIG. 7, which is composed of flat panel display 224 such as a liquid crystal panel and backlight 225 (third modified example). Note that the same reference numerals are assigned to constituents common to those in the above-described exemplary embodiment, and a description of the constituents will be omitted.

For example, backlight 225 is a planar light source formed by combining light-emitting diodes and a light guide plate with each other. The light guide plate is disposed along a back surface of flat panel display 224. When light of the light-emitting diodes enters the light guide plate from an edge portion of the light guide plate, a whole of a front surface of the light guide plate emits light, whereby a video is output from a front surface of flat panel display 224. Note that backlight 225 may be a planar light source formed by combining the light-emitting diodes and a diffusion plate with each other. The diffusion plate is disposed along the back surface of flat panel display 224. The diffusion plate diffuses the light that enters the diffusion plate from the light-emitting diodes. In this way, a whole of the diffusion plate emits light, and a video is output from the front surface of flat panel display 224.

In the third modified example, the front surface of flat panel display 224 serves as video display surface 221B, and optical element 30 is disposed on a part of video display surface 221B (front surface of flat panel display 224). Note that flat panel display 224 is not limited to the liquid crystal panel, and may be a self-luminous flat panel display such as an organic electro luminescence (EL) display. In this case, backlight 225 can be omitted. Note that this configuration of the third modified example may be applied to the first modified example described above.

Moreover, optical element 30 is disposed in front of the front surface of flat panel display 224 that serves as video display surface 221B in projection direction A1 of the light. Hence, video display surface 221 for displaying first virtual image 301 and second virtual image 302 can be composed of flat panel display 224 that is single.

In display device 10 of each of the exemplary embodiment and the first to third modified examples, which are described above, single optical element 30 is disposed on each of video display surfaces 221, 221B on which the video is displayed. However, a plurality of optical elements 30 may be disposed on each of video display surfaces 221, 221B.

Moreover, in display device 10 according to the third modified example, incident surface 31 of optical element 30 is inclined with respect to emission direction A1 of the light from video display 20B, and emitting surface 32 of optical element 30 is perpendicular to emission direction A1; however, this configuration may be reversed (fourth modified example).

Figure 8A:
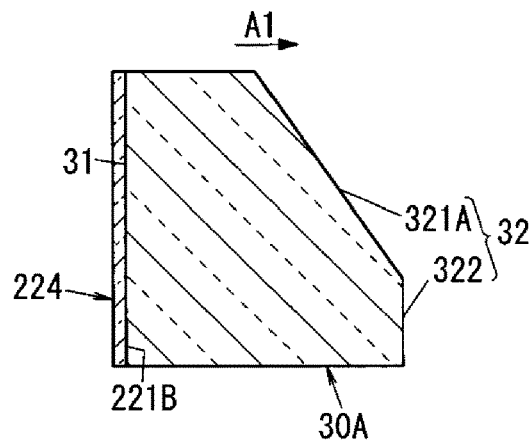
FIG. 8A is a conceptual diagram showing a principal portion of a display device according to a fourth modified example of the exemplary embodiment of the present disclosure.

FIG. 8A is a conceptual diagram showing a principal portion of display device 10 according to the fourth modified example. In FIG. 8A, constituents other than video display device 224 and optical element 30A are not shown.

In each of the exemplary embodiment and the first to third modified examples, which are described above, the normal line direction of video display surface 221 and emission direction A1 intersect each other at a predetermined angle larger than 0° and smaller than 90° (for example, an angle of 5° to 45°). In the fourth modified example shown in FIG. 8A, a normal line direction of video display surface 221B of video display device 224 is parallel to emission direction A1. In the fourth modified example, optical element 30A is provided on a whole of video display surface 221B. Incident surface 31 of optical element 30A is perpendicular to emission direction A1 of the light from video display 20B, and inclined portion 321A inclined with respect to video display surface 221B is provided on a part of emitting surface 32 of optical element 30A. In this way, emission direction A1 and a normal line direction of inclined portion 321A provided on emitting surface 32 intersect each other at a predetermined angle larger than 0° and smaller than 90° (for example, an angle of 5° to 45°). Meanwhile, region 322 of emitting surface 32, which is other than inclined portion 321A, is parallel to incident surface 31.

As described above, optical element 30A is provided on the whole of video display surface 221B, inclined portion 321A of emitting surface 32 of optical element 30 is inclined with respect to video display surface 221B, and region 322 of emitting surface 32, which is other than inclined portion 321A, is parallel to video display surface 221B. That is, incident surface 31 of optical element 30A is perpendicular to projection direction A1 of the light from video display 20B, and emitting surface 32 of optical element 30A (that is, the front surface of inclined portion 321A) is inclined with respect to projection direction A1 of the light from video display 20B. Hence, first virtual image 301 is projected onto target space 400 by the video of inclined portion 321A, and second virtual image 302 is projected onto target space 400 by the video of region 322 of emitting surface 32. Note that this configuration of the fourth modified example may be applied to the exemplary embodiment and the first to third modified examples, which are described above. However, the configuration of the fourth modified example is not an essential configuration of display device 10, and can be omitted as appropriate.

Figure 8B:
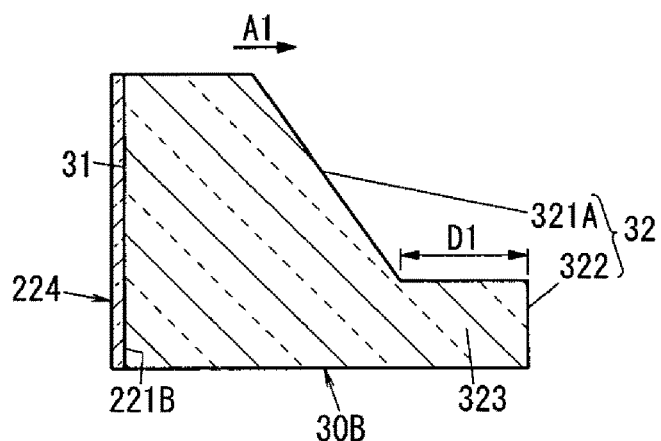
FIG. 8B is a conceptual diagram showing a principal portion of a display device according to a fifth modified example of the exemplary embodiment of the present disclosure.

In the above-described fourth modified example, there is no step difference between inclined portion 321A and region 322 other than inclined portion 321A on emitting surface 32. However, as shown in FIG. 8B, step difference D1 may be provided between inclined portion 321A and region 322 other than inclined portion 321A on emitting surface 32 (fifth modified example). That is, on the side of emitting surface 32 of optical element 30, columnar protrusion 323 that protrudes from a portion other than inclined portion 321A along emission direction A1 is provided, and a tip end surface of protrusion 323 serves as region 322 other than inclined portion 321A on emitting surface 32.

As described above, step difference D1 is present between inclined portion 321A and region 322 other than inclined portion 321A on emitting surface 32. Therefore, a route length of the light between region 322 of emitting surface 32 and user 200 can be shortened more than a route length of the light between inclined portion 321A and user 200. Hence, second virtual image 302 projected by the video displayed on region 322 of emitting surface 32 is displayed closer to user 200 than first virtual image 301 projected by the video displayed on region 223 of video display surface 221 is. This configuration of the fifth modified example may be applied to the exemplary embodiment and the first to third modified examples, which are described above. However, the configuration of the fifth modified example is not an essential configuration of display device 10, and can be omitted as appropriate.

Figure 8C:
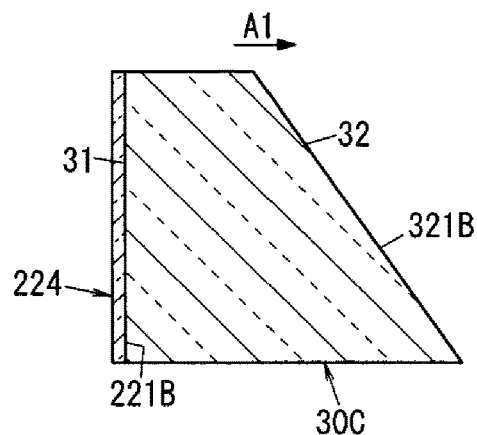
FIG. 8C is a conceptual diagram showing a principal portion of a display device according to a sixth modified example of the exemplary embodiment of the present disclosure.

Moreover, in each of the above-described fourth and fifth modified examples, a part of emitting surface 32 of optical element 30 is defined as inclined portion 321A. However, as shown in FIG. 8C, the whole of emitting surface 32 may be defined as inclined portion 321B (sixth modified example).

In the sixth modified example, the whole of emitting surface 32 of optical element 30C serves as inclined portion 321B, and first virtual image 301 along road surface 600 is projected onto the target space by a video of inclined portion 321B. Note that this configuration of the sixth modified example may be applied to the exemplary embodiment and the first to third modified examples, which are described above. However, the configuration of the sixth modified example is not an essential configuration of display device 10, and can be omitted as appropriate.

In the sixth modified example, inclined portion 321B of emitting surface 32 of optical element 30C is composed of a single plane; however, may be composed of a plurality of planes having different angles from one another. Virtual images having inclinations different from one another can be projected by videos individually displayed on the plurality of planes.

Moreover, in the exemplary embodiment and the first to sixth modified examples, which are described above, inclined portions 321, 321A, 321B of optical elements 30, 30A, 30B, 30C may be not planar but curved. Furthermore, emitting surfaces 32 (including inclined portions 321, 321A, 321B) of optical elements 30, 30A, 30B, 30C may be formed into a shape reflecting a shape of windshield 101 which is a reflecting member. This enables desired virtual image 300 to be projected even when a three-dimensional shape of windshield 101 varies depending on a type of vehicle 100.

Figure 9:
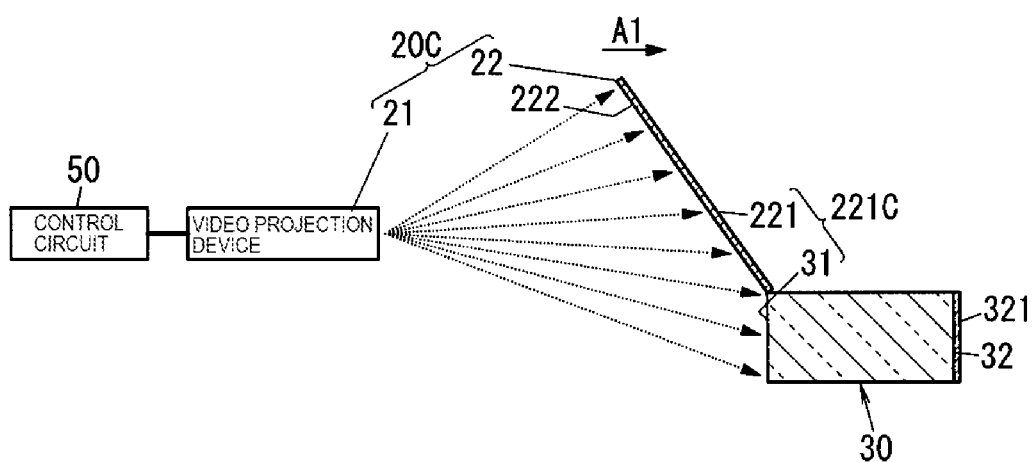
FIG. 9 is a conceptual diagram showing principal portions of a display device according to a seventh modified example of the exemplary embodiment of the present disclosure.

Although optical element 30 is disposed on a part of the front surface of screen 22 in the above-described exemplary embodiment, screen 22 and optical element 30 may be disposed side by side as shown in FIG. 9 (seventh modified example). Note that the same reference numerals are assigned to constituents common to those in the above-described exemplary embodiment, and a description of the constituents will be omitted.

Screen 22 and optical element 30 are fixed at predetermined positions with respect to the housing and the like of display device 10. Here, the front surface of screen 22 is inclined with respect to projection direction A1 of the light from video projection device 21, and one end of back surface 222 of screen 22 and incident surface 31 of optical element 30 are located at substantially the same position in projection direction A1 of the light. Herein, an angle made by the normal line direction of the front surface of screen 22 and projection direction A1 of the light is preferably an angle larger than 0° and smaller than 45°.

Moreover, light diffuser 33 having light diffusibility is fixed to emitting surface 32 of optical element 30 by adhesive or the like. Light diffuser 33 is formed of a resin material in which a light diffusing agent having different refractive index from that of transparent resin is dispersed in the transparent resin. Note that light diffuser 33 may be one in which microprisms are formed on a surface of a flat plate made of transparent resin or transparent glass.

The light projected from video projection device 21 enters back surface 222 of screen 22 and incident surface 31 of optical element 30. In this way, videos are displayed on the front surface of screen 22 and a front surface of light diffuser 33 fixed to emitting surface 32 of optical element 30. That is, in the seventh modified example, the front surface of screen 22 and the front surface of light diffuser 33 fixed to emitting surface 32 of optical element 30 serve as video display surfaces which display the videos, and virtual images are projected onto the target space by the videos displayed on these video display surfaces.

As described above, light diffuser 33 is provided on emitting surface 32 of optical element 30. Accordingly, even if external light such as sunlight hits light diffuser 33 for example, the external light is diffusely reflected by light diffuser 33. Therefore, light rays as a result of specular reflection of the sunlight are weakened, and glaring light is less likely to hit user 200. Moreover, also in each of the above-described first to third modified examples, the plurality of optical elements 30 may be disposed on the video display surface. However, the configuration of the seventh modified example is not an essential configuration of display device 10, and can be omitted as appropriate.

Here, in the seventh modified example shown in FIG. 9, incident surface 31 of optical element 30 and back surface 222 of screen 22 intersect each other at a predetermined angle; however, incident surface 31 of optical element 30 and back surface 222 of screen 22 may be parallel to each other.

In this case, screen 22 may be configured to be movable in a movement direction (left/right direction of FIG. 9) with respect to the housing and the like of display device 10. That is, when display device 10 is disposed in dashboard 102, optical element 30 is fixed at a predetermined position in dashboard 102, and screen 22 is movable in dashboard 102 in the movement direction.

Display device 10 just needs to include a drive unit that moves screen 22 in the movement direction. For example, the drive unit is composed of an electric drive actuator such as a voice coil motor, and moves screen 22 in response to a control signal output from control circuit 50. Moreover, a device of a laser scan type just needs to be used for the video display device. The video display device projects laser light onto screen 22 while the drive unit is moving screen 22, whereby the same state as when the video is drawn on the screen disposed obliquely with respect to the movement direction is obtained, and first virtual image 301 is projected onto the target space.

Furthermore, display device 10 is not limited to the configuration of projecting virtual image 300 onto target space 400 set in front of vehicle 100 in the traveling direction. For example, display device 10 may project virtual image 300 on a side portion, rear portion, upper portion and the like in the traveling direction of vehicle 100.

In addition, display device 10 is not limited to the head-up display for use in vehicle 100. For example, display device 10 is also applicable as a display for a mobile body other than vehicle 100, the other mobile body including a motorcycle, a train, an aircraft, a construction machine, a vessel and the like. Moreover, the place of use of display device 10 is not limited to the mobile body. For example, display device 10 may be used in an amusement facility. Display device 10 may also be used as a wearable terminal such as a head mounted display (HMD). Furthermore, display device 10 may be used at a medical facility, and may be used as a stationary device.

(Conclusion)

Display device (10) of the first aspect includes video display (20, 20A, 20B, 20C), optical element (30), and projector (40). Video display (20, 20A, 20B, 20C) displays a video on video display surface (221, 221B). Optical element (30) receives, on incident surface (31), at least a part of the video displayed on video display surface (221, 221B), and emits an incident video, which is the part of the video received on incident surface (31), from emitting surface (32). Projector (40) projects virtual image (300) viewed by a user by projecting light output from video display (20, 20A, 20B, 20C) and optical element (30) to a reflecting member. Inclined portion (321, 321A, 321B) inclined with respect to at least a part of video display surface (221, 221B) is provided on at least a part of emitting surface (32) of optical element (30).

In accordance with this configuration, virtual image (300) is projected onto target space (400) by the video of inclined portion (321, 321A, 321B). Hence, in comparison with the case of projecting videos on two screens in order to project virtual images having different inclinations, the depth of focus of video display (20, 20A, 20B, 20C) can be reduced, and the resolution of the video, that is, the resolution of the virtual image can be improved.

In display device (10) of the second aspect, in the first aspect, virtual image (300) includes first virtual image (301) projected onto first virtual plane (501) in which inclination angle (a) with respect to optical axis (500) of projector (40) is smaller than a predetermined value, and second virtual image (302) projected onto second virtual plane (502) in which an inclination angle (13) with respect to optical axis (500) of projector (40) is larger than the predetermined value.

In accordance with this configuration, first virtual image (301) and second virtual image (302) can be projected onto target space (400) by the video displayed on the video display surface.

In display device (10) of the third aspect, in the second aspect, optical element (30) is disposed on a part of video display surface (221, 221B). Second virtual image (302) is projected by light transmitted through inclined portion (321, 321A, 321B), and first virtual image (301) is projected by light transmitted through a portion other than inclined portion (321, 321A, 321B) out of light transmitted through video display (20, 20A, 20B, 20C) and optical element (30).

In accordance with this configuration, the leak light with which video display (20, 20A, 20B, 20C) directly irradiates the user can be reduced In display device (10) of the fourth aspect, in the second aspect, inclined portion (321, 321A, 321B) is provided on a part of emitting surface (32) of optical element (30). First virtual image (301) is projected by light transmitted through inclined portion (321, 321A, 321B), and second virtual image (302) is projected by light transmitted through a region other than inclined portion (321, 321A, 321B) out of emitting surface (32).

In accordance with this configuration, the leak light with which video display (20, 20A, 20B, 20C) directly irradiates the user can be reduced In display device (10) of the fifth aspect, in any one of the first to fourth aspects, incident surface (31) of optical element (30) is inclined with respect to projection direction (A1) in which the light output from the video display (20, 20A, 20B, 20C) is projected, and emitting surface (32) of optical element (30) is perpendicular to projection direction (A1) in which the light output from the video display (20, 20A, 20B, 20C) is projected.

In accordance with this configuration, an inclination of virtual image (300, 301, 302) projected onto target space (400) can be changed by optical element (30).

In display device (10) of the sixth aspect, in any one of the first to fourth aspects, incident surface (31) of optical element (30) is perpendicular to projection direction (A1) in which the light output from the video display (20, 20A, 20B, 20C) is projected. Emitting surface (32) of optical element (30) is inclined with respect to projection direction (A1) in which the light output from the video display (20, 20A, 20B, 20C) is projected.

In accordance with this configuration, the inclination of virtual image (300, 301, 302) projected onto target space (400) can be changed by optical element (30).

In display device (10) of the seventh aspect, in any one of the first to sixth aspects, optical element (30) is disposed in front of video display surface (221, 221B) in projection direction (A1) in which the light is projected.

In accordance with this configuration, optical element (30, 30A, 30B) can move a part of the video, which is displayed on video display surface (221, 221B), in front in projection direction (A1). In addition, there is also an advantage that video display surface (221, 221B) can be composed of a single screen or a single video display device.

In display device (10) of the eighth aspect, in any one of the first to seventh aspects, a light diffuser that diffuses light is provided on emitting surface (32) of optical element (30).

In accordance with this configuration, light diffuser (33) is provided on emitting surface (32, 32A, 32B). Therefore, even if the external light such as sunlight hits light diffuser (33) for example, the external light can be diffusely reflected by light diffuser (33).

In display device (10) of the ninth aspect, in any one of the first to eighth aspects, video display (20, 20A, 20B, 20C) is a projection device that projects light onto video display surface (221, 221B) to form an image on video display surface (221, 221B).

In accordance with this configuration, the depth of focus of video display (20, 20A, 20C) can be reduced, and therefore, a video with high resolution can be displayed on the video display surface.

In display device (10) of the tenth aspect, in any one of the first to eighth aspects, the video display is video display device (20B) that has a flat display panel displaying the video, and a backlight.

In accordance with this configuration, the screen can be eliminated in comparison with the video display that projects the video.

A mobile body of an eleventh aspect includes: body (109); display device (10) according to any one of the first to tenth aspects, display device (10) being mounted on body (109); reflecting member (101) fixed to body (109); and drive unit (104) that moves body (109).

In accordance with this configuration, mobile body (100) including display device (10) capable of improving the resolution of the virtual image can be provided.

The present disclosure is useful for a display device, and for a mobile body including the display device.

What is claimed is:

1. A display device comprising:
   a video display that displays a video on a video display surface, the video including a first video and a second video;
   an optical element that is disposed on a part of the video display surface and has an incident surface on which the second video is incident, and an emitting surface which emits the second video transmitted through the optical element from the incident surface, the incident surface being inclined with respect to the emitting surface; and
   a reflector that reflects the first video output from the video display and the second video emitted from the emitting surface of the optical element to a reflecting member
   such that the first video and the second video are viewed by a user as a virtual image including a first virtual image corresponding to the first video and a second virtual image corresponding to the second video.

2. The display device according to claim 1, wherein the first virtual image is projected onto a first virtual plane in which an inclination angle with respect to an optical axis of the display device is smaller than a predetermined value, and the second virtual image is projected onto a second virtual plane in which an inclination angle with respect to the optical axis of the display device is larger than the predetermined value.

3. The display device according to claim 1, wherein
   the incident surface of the optical element is inclined with respect to a projection direction in which the video displayed on the video display is projected, and the emitting surface of the optical element is perpendicular to the projection direction in which the video displayed on the video display is projected.

4. The display device according to claim 1, wherein
   the incident surface of the optical element is perpendicular to a projection direction in which the video displayed on the video display is projected, and
   the emitting surface of the optical element is inclined with respect to the projection direction in which the video displayed on the video display is projected.

5. The display device according to claim 1, wherein a light diffuser is provided on the emitting surface of the optical element and diffuses light from the second video.

6. The display device according to claim 1, wherein the video display is a projection device that projects light onto the video display surface to form an image on the video display surface.

7. The display device according to claim 1, wherein the video display is a video display device that has a flat display panel displaying the video, and a backlight.

8. A mobile body comprising:
   a body;
   the display device according to claim 1, the display device being mounted on the body;
   the reflecting member fixed to the body; and
   a drive unit that moves the body.

9. The display device according to claim 1, wherein the optical element is a bundle of a plurality of optical fibers.

10. The display device according to claim 1, wherein the optical element is a group of fibrous crystals.

11. The display device according to claim 1, wherein a position at which the second virtual image is projected is nearer to the user than a position at which the first virtual image is projected.

12. The display device according to claim 1, wherein the emitting surface is on an opposite side from the incident surface.

13. A display device comprising:
   a video display that displays a video on a video display surface, the video including a first video and a second video;
   an optical element that is disposed on an entirety of the video display surface and has an incident surface on which the first video and the second video are incident, and an emitting surface which includes a first emitting surface and a second emitting surface, the incident surface being inclined with respect to the first emitting surface, the first emitting surface emitting the first video transmitted through the optical element from the incident surface, the second emitting surface being positioned at a distance from the video display surface that is greater than a distance between the first emitting surface and the video display surface, and emitting the second video transmitted through the optical element from the incident surface; and
   a reflector that reflects the first video emitted from the first emitting surface and the second video emitted from the emitting surface to a reflecting member such that the first video and the second video are viewed by a user as a virtual image, the virtual image includes a first virtual image corresponding to the first video and a second virtual image corresponding to the second video.

14. The display device according to claim 13, wherein the first virtual image is projected onto a first virtual plane in which an inclination angle with respect to an optical axis of the display device is smaller than a predetermined value, and the second virtual image is projected onto a second virtual plane in which an inclination angle with respect to the optical axis of the display device is larger than the predetermined value.

15. The display device according to claim 13, wherein the optical element is a bundle of a plurality of optical fibers.

16. The display device according to claim 13, wherein the optical element is a group of fibrous crystals.

17. The display device according to claim 13, wherein a position at which the second virtual image is projected is nearer to the user than a position at which the first virtual image is projected.

\* \* \* \* \*